United States Patent [19]

Hupe

[11] Patent Number: 5,470,110
[45] Date of Patent: Nov. 28, 1995

[54] SAFETY SHIELD FOR FLANGE TYPE COUPLING

[76] Inventor: Lawrence R. Hupe, 4118 Chico Rd., Pascagoula, Miss. 39567

[21] Appl. No.: 192,459

[22] Filed: Feb. 7, 1994

[51] Int. Cl.$^6$ .............................. F16L 55/17; F16L 55/00
[52] U.S. Cl. .................... 285/13; 285/45; 24/300
[58] Field of Search .................... 285/13, 14, 45, 285/924; 24/300, 301, 271

[56] References Cited

U.S. PATENT DOCUMENTS

| | | | |
|---|---|---|---|
| 1,255,023 | 1/1918 | Lang | 285/45 |
| 2,699,960 | 1/1955 | Callery et al. | |
| 2,708,123 | 5/1955 | Risley et al. | |
| 3,113,790 | 11/1963 | Matthiessen | |
| 3,561,793 | 2/1971 | Rode | 285/13 |
| 3,597,263 | 8/1971 | Bancroft et al. | |
| 3,738,383 | 6/1973 | Walfried | |
| 3,850,451 | 11/1974 | Matthiessen | |
| 3,887,221 | 6/1975 | Young | |
| 4,106,428 | 8/1978 | Matthiessen | |
| 4,127,287 | 11/1978 | Davies | 285/14 |
| 4,216,980 | 8/1980 | Shreve | |
| 4,281,859 | 8/1981 | Davies | 285/14 X |
| 4,483,554 | 11/1984 | Ernst | 285/45 |
| 4,854,611 | 8/1989 | Press | 285/15 |
| 4,950,000 | 8/1990 | Richardson | 285/14 |

*Primary Examiner*—Randolph A. Reese
*Assistant Examiner*—Heather Chun Shackelford
*Attorney, Agent, or Firm*—Alexander F. Norcross; George L. Williamson

[57] ABSTRACT

A shielding device provides an area of protection to mechanics during initial unbolting of flanged pipe connections, to block and redirect any unexpected discharge of product away from the mechanic to the opposite side of the flange. This device has an elongated body wrapped around a pipe flange positioned in the gap area between the flanges. The body is made from an elastic material such as rubber or plastic, or a pliable material such as rubber, plastic or teflon, and is secured to the flange by fasteners on each end of the device. The device provides an area of protection greater than half the circumference of the flange, by having the elongated body securely seated in the gap of the flange over this area. The remaining area of the flange gap remains unobstructed to discharge product leaks.

7 Claims, 10 Drawing Sheets

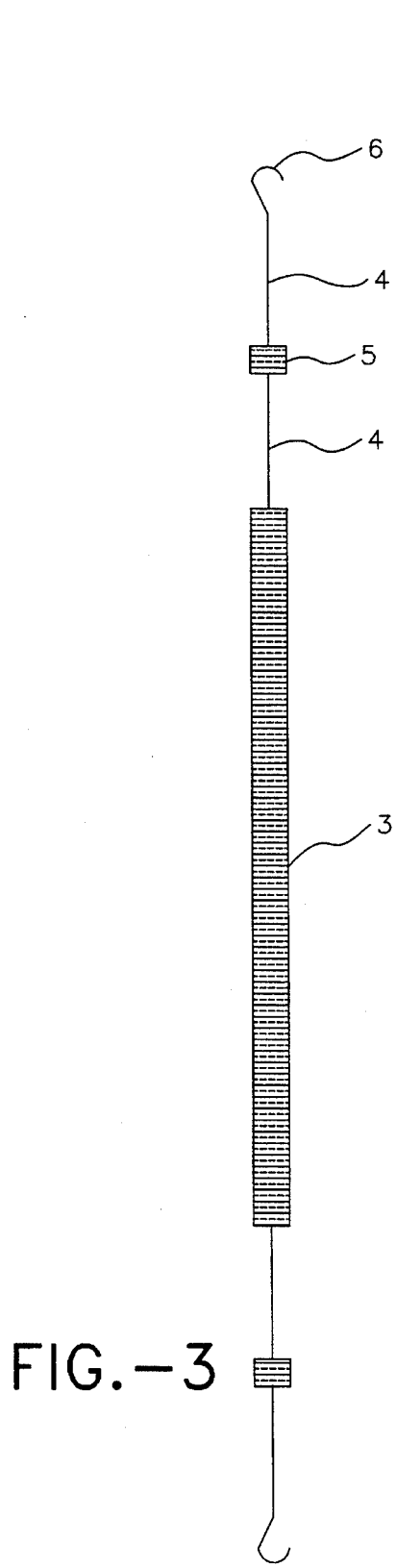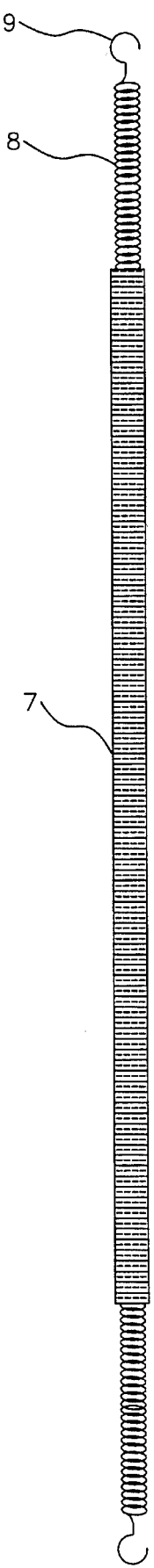
FIG.—3  FIG.—4

5,470,110

SAFETY SHIELD FOR FLANGE TYPE COUPLING

BACKGROUND OF THE INVENTION

1. Field of Invention

This invention relates in general to a deflector shield for intercepting and redirecting unexpected product leaks from pipe flanges when maintenance needs require the unbolting of a flange joint.

2. Description of Prior Art

In the past, safety shields for flanged pipe couplings have been taught by patents to Matthiessen, U.S. Pat. Nos. 3,113,790, 3,527,479, and 3,850,451, also Shreve, U.S. Pat. No. 4,216,980. These past teachings were concerned with possible ruptures in flange gasket areas while the pipe was in service. The intent of their patents was to protect workers from unexpected spraying of product from flanges in units that were operational and under pressure. The past inventions would hinder a worker's ability to unbolt a flange with those devices attached, while affording no protection to the worker if in fact the system was still pressured.

SUMMARY OF THE INVENTION

The intent of this invention is to provide protection for workers who must unbolt flanges in units or systems that are not operational and are believed to be depressured. Before any worker attempts to unbolt a flange coupling, the system is supposed to be depressured, and bled down. Unfortunately for some workers, mistakes are made and systems they believe are depressured are in fact still pressured. This invention will reduce the present danger to workers when systems under pressure are opened mistakenly, while reducing the number of hazardous situations that occur in the oil and chemical industry.

The present invention is directed to a safety shield for a pipe coupling flange comprising an elongated, flexible body of pliable material such as rubber, plastic or teflon that is round or tapered cross sectionally. The cross section diameter or width of taper of the elongated body will be substantially larger than the gap of the flange it is applied to. This body has fasteners at each end to secure the body to the flange gap area of the pipe coupling. The length of this device will be less than the circumference of the flange it is being attached to, requiring said device to be stretched over the flange gap to engage the opposing fasteners which secure the device in place. The elastic nature of the body it self, attached springs or self-tensioning clamps will allow for stretching and provide tension for securing the device to the flange. This device is applied to the outside diameter of the flange and is seated in the gap of the flange. The round or tapered shape of the body will cause the elongated strip to flow naturally into the gap area when tension is applied, and provide a positive seating even when the flanges are off set slightly. This device will effectively close off an area greater than half the circumference of the gap area while allowing the remaining area to be open and free to discharge possible product leakage.

A primary object of this invention is to block off a large area of the flange gap opening between mating flanges. To provide an area of protection to workers during the initial unbolting of flange pipe couplings. When workers attempt to loosen flange couplings they relieve the pressure on the sealing gasket area which will cause a stream or spray of product to be released at some point of the gasket area if pressure is present in the system. It is this unexpected initial release of product that this invention is intend to block and redirect away from the worker.

Another object of this invention is to provide an immediate indication of leakage to the worker while in the protected area allowing the worker to safely retighten the flange while protected from the spray.

Yet another object of the invention is to provide a personal protection device that is simple to use and is applied to the flange. At present, workers wear protective clothing such as acid suits which does provide protection from unexpected spray. However, many workers when sprayed with a dangerous product will panic and try to leave the area even though they are in protective clothing. This type of situation causes many injuries every year when workers trip or run into something during their panicked escape from a spraying flange. The secondary hazard also created by this situation is that the flange is not retightened and product continues to spray which endangers other workers until operators can block the system at some other area. The uniqueness of this invention is that it utilizes the flange itself for containing and redirecting spray out away from workers, which creates an environment that allows workers the ability to stay in the area long enough to secure the flange that is leaking.

Another object is to utilize this invention as a permanent shield in operating units to protect workers from unexpected sprays in hazardous areas, similar to the past art described earlier. The device could be positioned to redirect product discharges away from normal walk areas, allowing workers to identify the leaks before it sprays someone.

Another object of this invention is to provide workers a personal protection device that they can utilize on flanges in areas that do not require special protective clothing. If a worker is only required to wear a face shield and goggles and is sprayed in the face opening a line containing a noncorrosive substance he might panic and injure himself or create a fire hazard if the flange is not retightened. Here again, this invention provides protection not available before, that is easy and convenient to use, which workers could utilize when opening any flange regardless of the possible content in the system or protective clothing requirements.

It is a further object of the Invention:

(1) To provide an area of protection from a stream or spray of product for workers during the initial loosening of pipe flanges.

(2) To provide a shielded area in such a way that it will not hinder access to flange bolts.

(3) To maintain an effective shield as the flanges separate slightly during unbolting.

(4) To shield the worker while providing an immediate indication of leakage, allowing the worker to quickly determine whether or not there is pressure in the system, in order to determine if the flange should be retightened.

This invention provides employers a practical and cost effective device that will reduce injuries and hazardous situations on the job by providing their workers an easy and convenient personal protection device that was not available prior to this invention.

BRIEF DESCRIPTION OF THE FIGURES

FIG. 3 is a full length view of the safety shield with an expandable body and fastener extensions.

FIG. 4 is a full length view of the safety shield arrangement with a nonexpendable body with attached spring tensioners.

FIG. 16 is an alligator clasp.

FIG. 17 is a flexible rubber draw latch.

FIG. 18 is a self-tensioning lever clamp.

FIG. 19 is a double hook extension interlock.

FIG. 20 is a simple hook interlock.

FIG. 21 is a wing nut draw bar tensioner.

FIG. 22 is a double hook and bar interlock.

FIG. 23 is a wedge lock securement device.

DETAILED DESCRIPTION OF THE INVENTION

Figure 1:
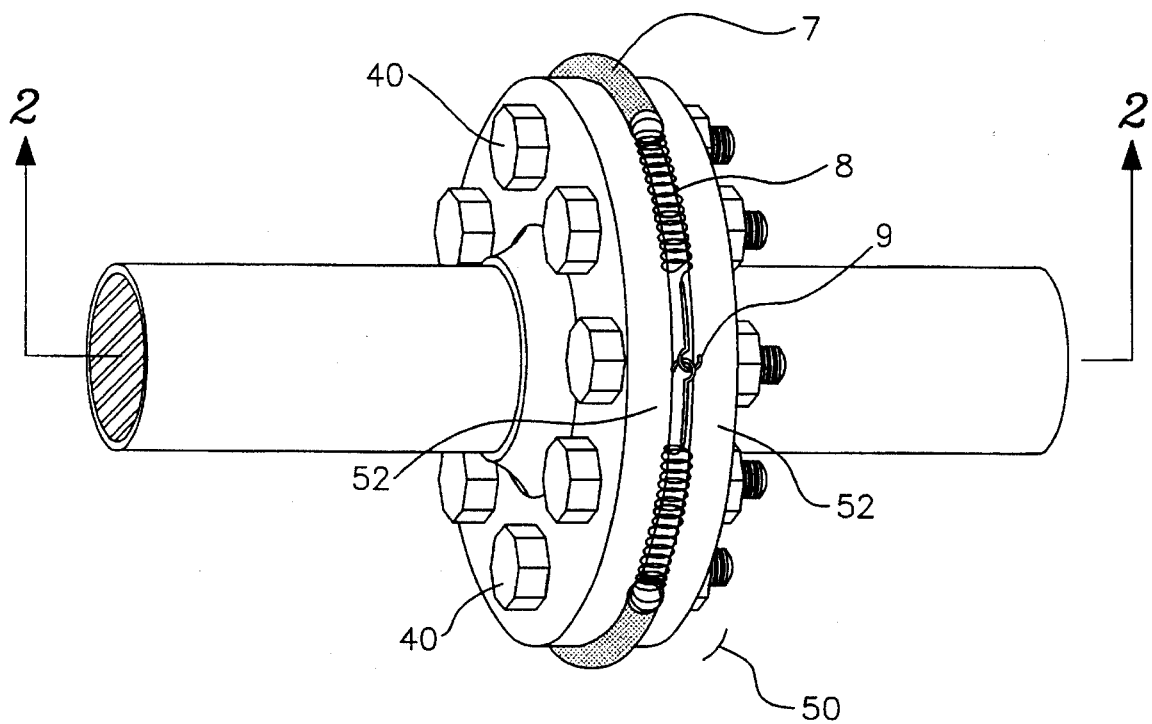
FIG. 1 is a perspective view of the safety shield secured to a flange coupling. This view displays the nonexpendable body type with spring tensioners.

To better describe the features of this new invention, this safety shield's use will be related to a common type of flanged pipe coupling 50 commonly found in chemical and similar industries in which corrosive and hazardous fluids are transported through piping systems. These couplings range in size from ½ inch pipe to 20 inch pipe and larger. The flange circumference of these couplings varies from a few inches to several feet, while the gap 13 distance between the flanges range from ⅛ inch to several inches. The number of flange bolts 40 varies from as few as four on small flanges to more than thirty on larger couplings. Such couplings 50 normally include flange sections 52 with faces lying in planes normal to the longitudinal axis 2 of the pipe. The faces of the flanged sections 52 are fastened together by bolts 40 which compress a gasket 54 on raised surfaces of the flanges inside of the bolt circle of the flange to form a liquid tight seal.

Due to maintenance needs these flanges must be unbolted on occasion. Prior to a worker unbolting a flange the system involving that flange is supposed to be depressured and drained of product. However, on occasion mistakes are made and a worker unknowingly opens a flange on a system that is still pressured. This situation will cause a stream or spray of product to be released when the worker loosens the bolts and breaks the gasket seal at some point of the sealing area. This invention allows workers the ability to block off a large area of the flange gap providing an area of protection to the worker, while allowing the worker to predetermine the point at which surprise leakage will exit from the flange gap radius. At present, it is this uncontrolled surprise release 20 of product that endangers plant and personal, that this invention is designed to control.

Figure 2:
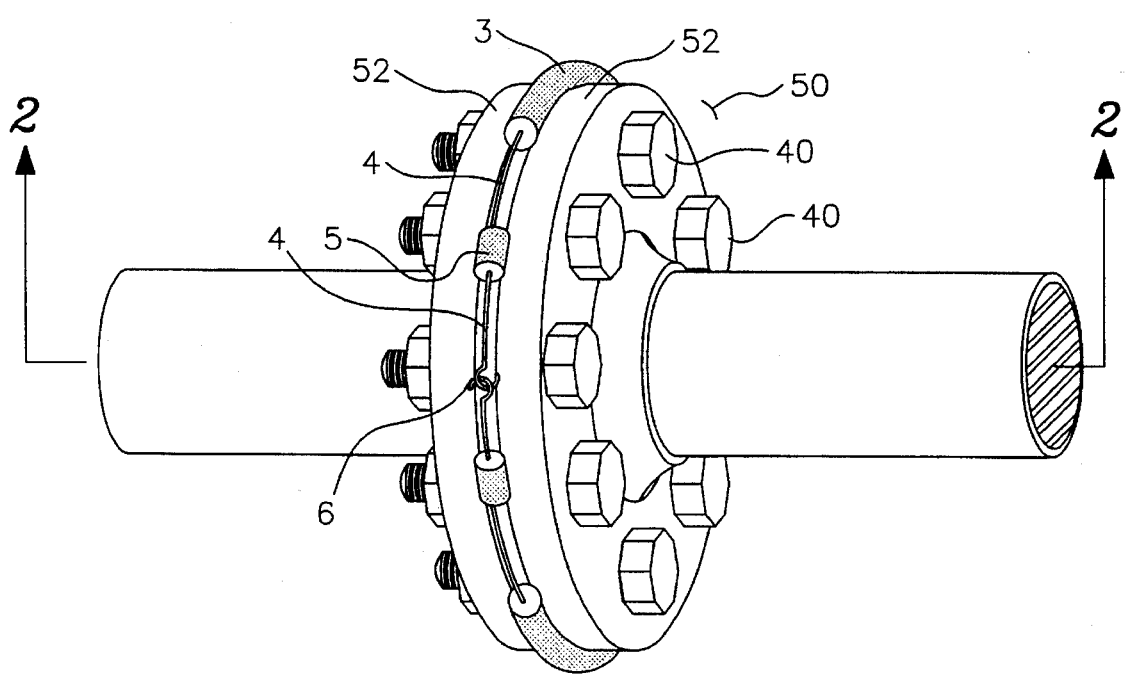
FIG. 2 is a perspective view of the safety shield secured to a flange coupling. This view shows the expandable body type with nonexpendable fastener extensions for securing device.
Figure 6:
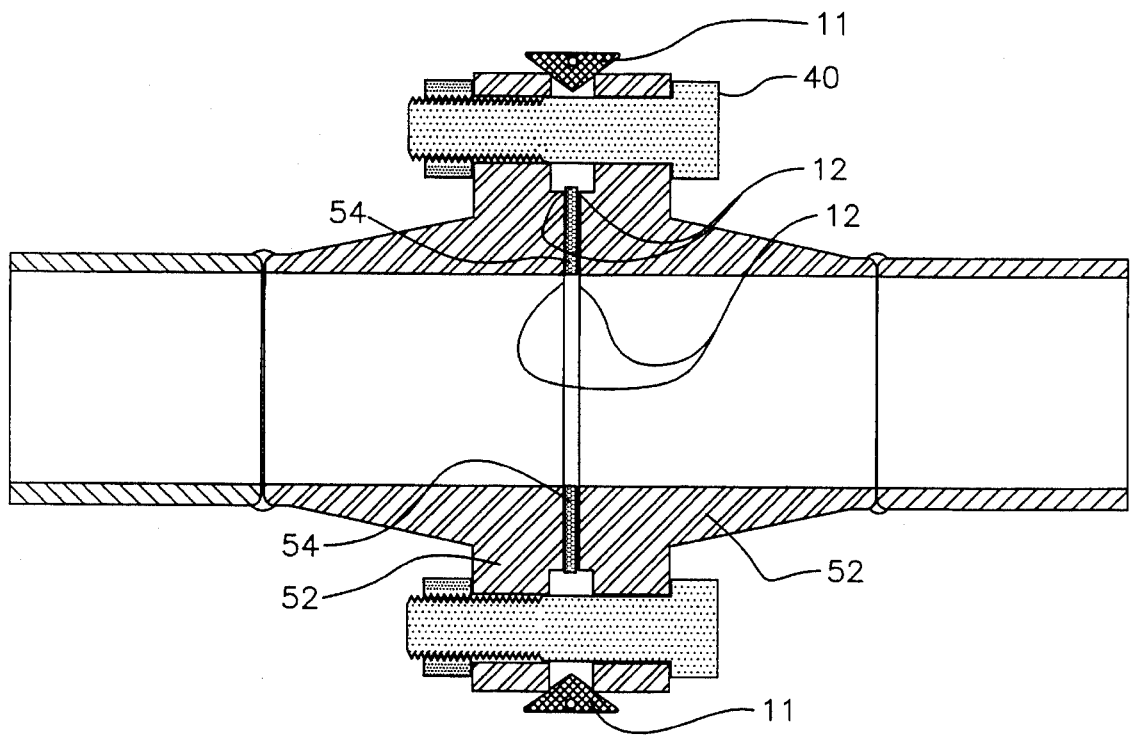
FIG. 6 is a second sectional view on the plane of 1—1 of FIG. 1 the tapered type shielding body seated in the flange gap of the coupling.
Figure 7:
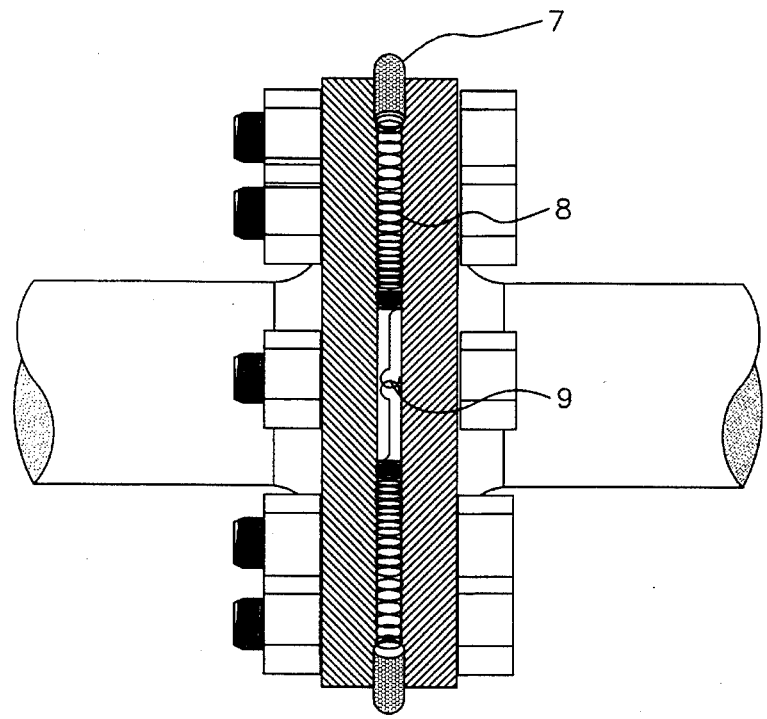
FIG. 7 is a side view of a flange coupling with shield attached. This view shows the spring tensioner type of shield securement as well as the open area of the flange gap created by this type of securement.
Figure 8:
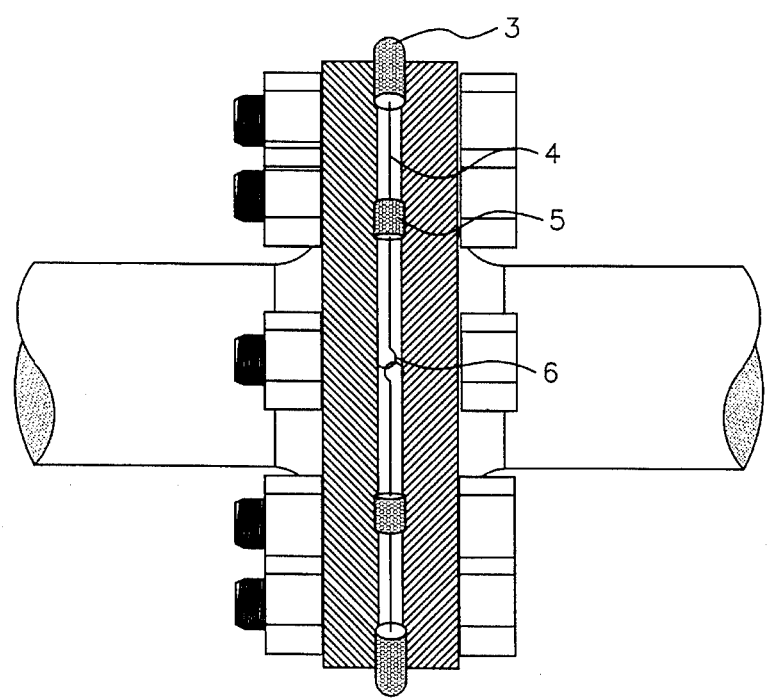
FIG. 8 is a side view of a flange coupling with a fastener extension type shield attached. This view shows the fastener extensioners engaged on the flange and the open area of the flange gap created by this style of securement.
Figure 9:
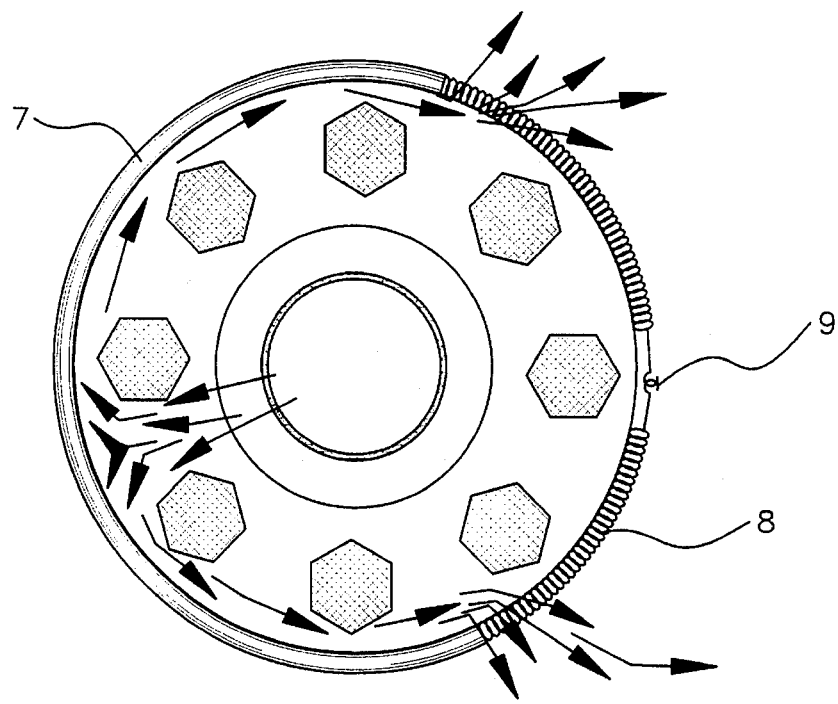
FIG. 9 is an axial view of a flange coupling with a flange gap shield in place, secured by the spring tensloners. It shows the area sealed off by the elongated body as well as the open area created by the spring tensloners. It also illustrates how leakage would be blocked and then redirected to exit through the spring tensioner area of the flange gap.
Figure 10:
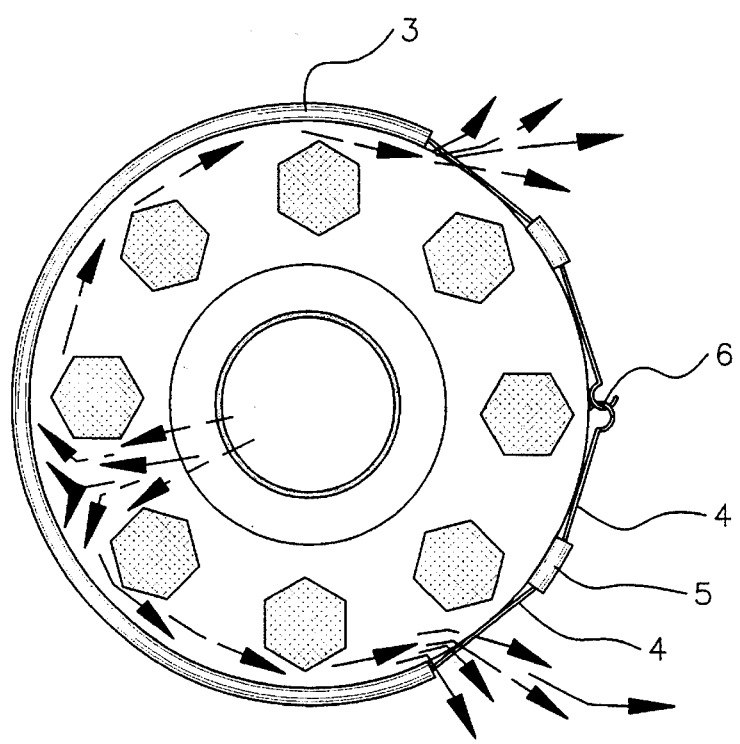
FIG. 10 is the same axial view as FIG. 9 but this view depicts the use of a shield with fastener extensions as the securing means and illustrates how the fastener extensions create an open area over a portion of the flange gap area to allow for product escape.
Figure 11:
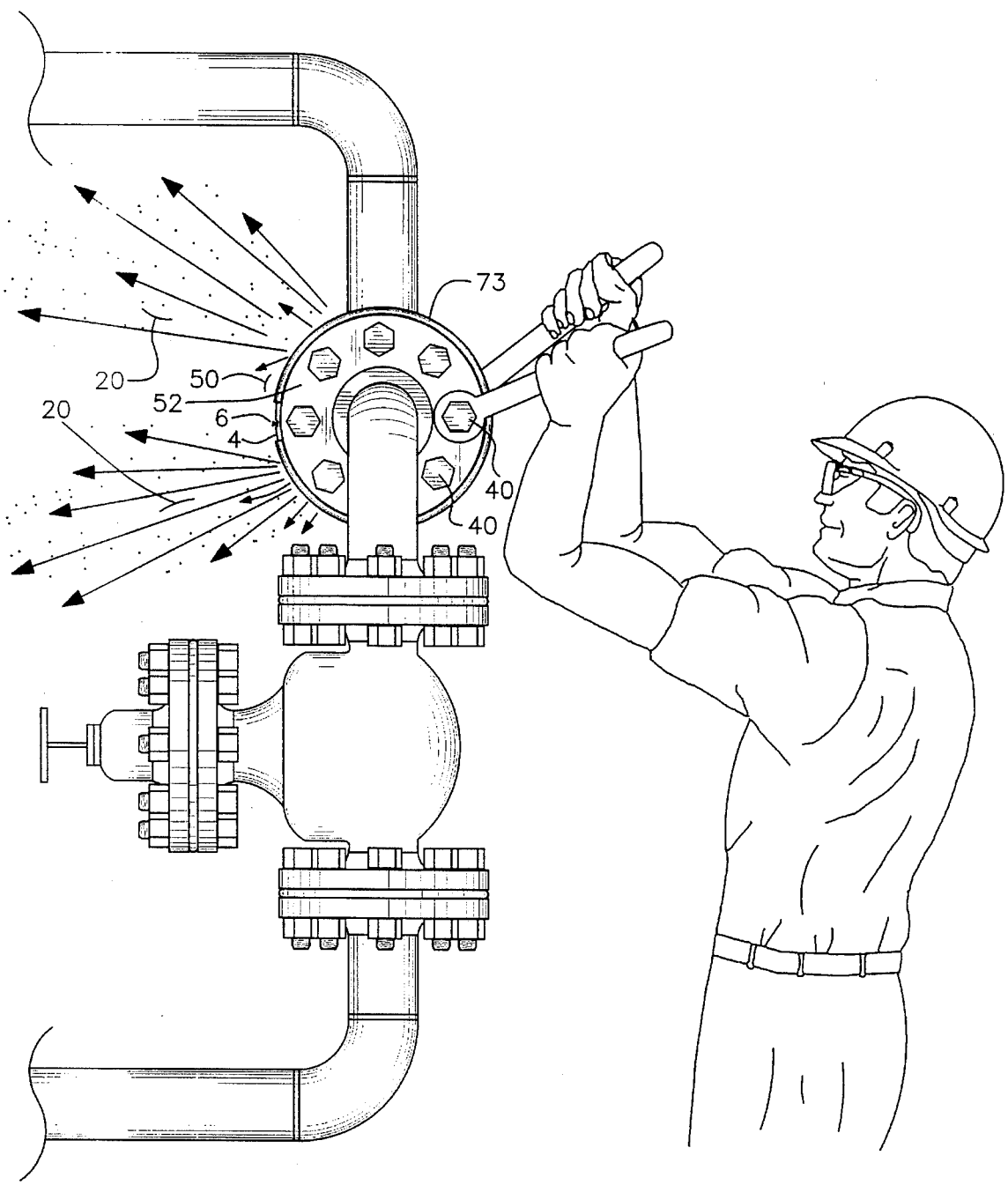
FIG. 11 is an illustrated view of a worker utilizing a flange gap deflector shield and depicts how surprise leakage would be directed away from the worker.
Figure 12:
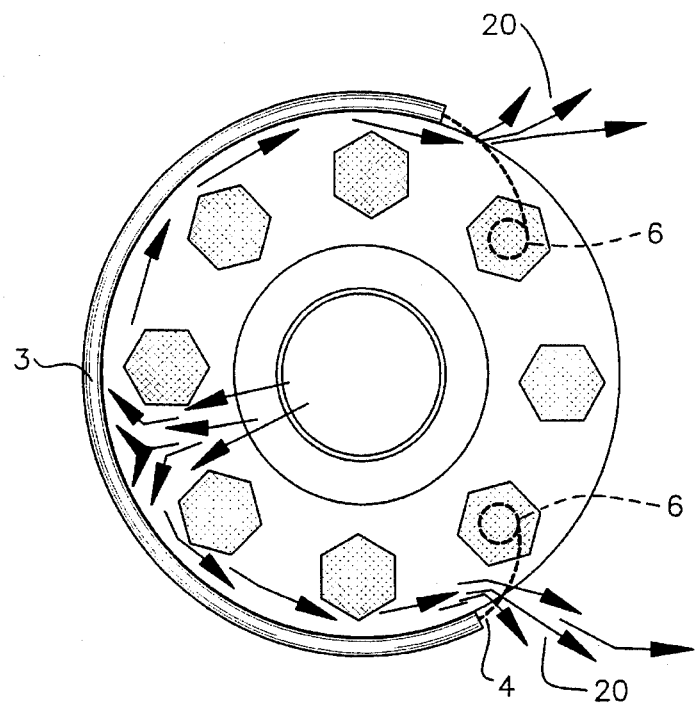
FIG. 12 is an axial view of a flange coupling with shield attached by means of large hooks secured to separate bolt bodies within the flange gap of the opposing flanges.
Figure 13:
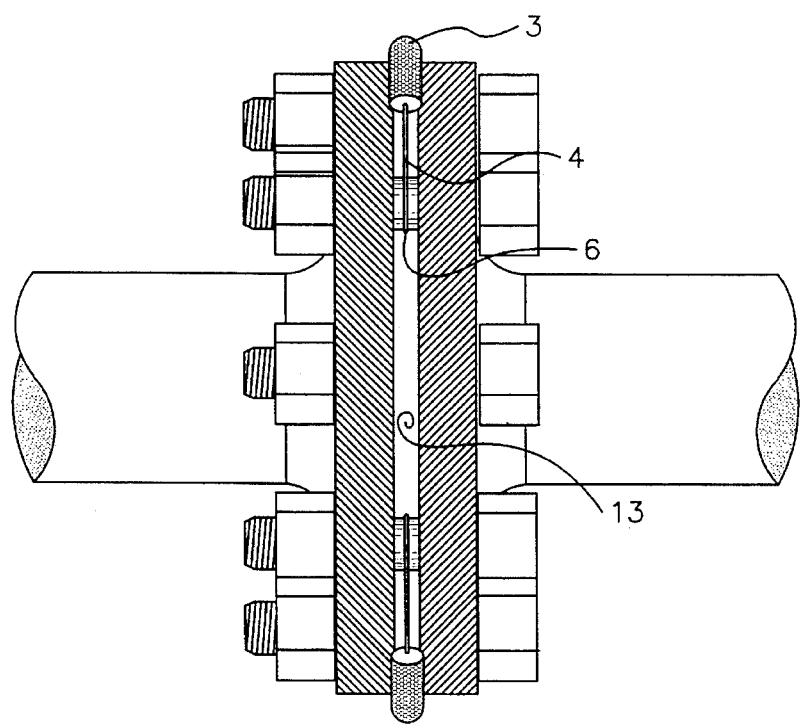
FIG. 13 is a side view of FIG. 12 and shows the open area over that flange gap created by the of separate hook securement within the flange gap.
Figure 14:
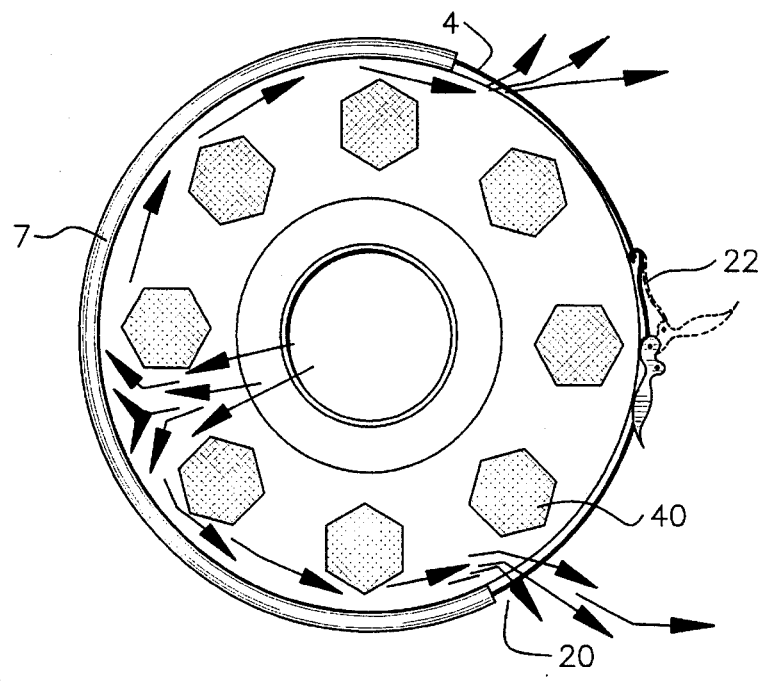
FIG. 14 is an axial view of a flange coupling with shield attached by means of double fastener extensions lying on the outer circumference of each opposing flange secured by a self-tensioning lever clamp.
Figure 15:
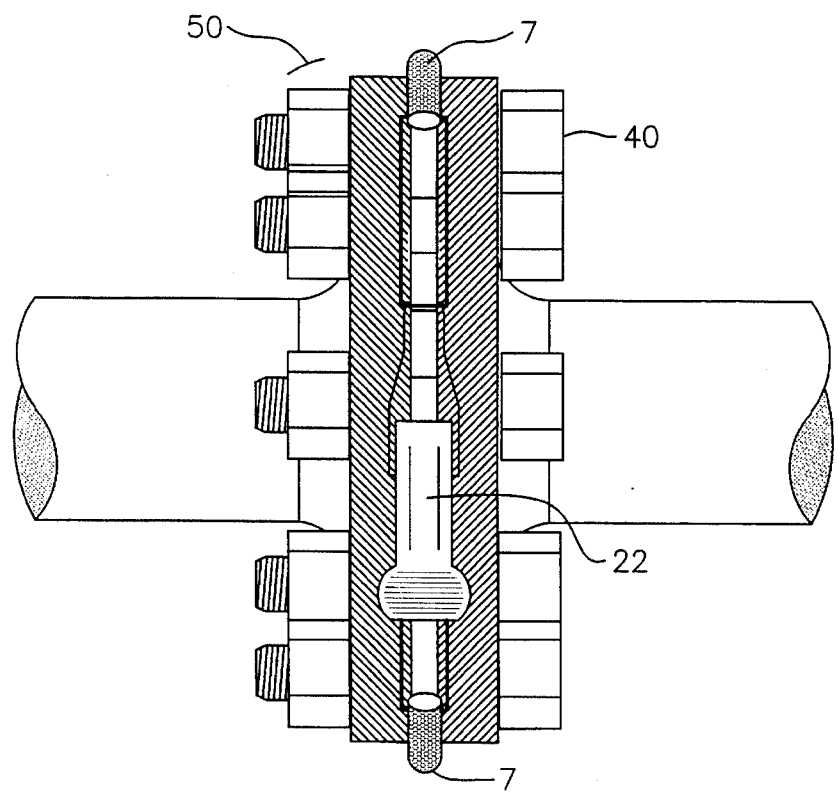
FIG. 15 is a side view of FIG. 14 showing the double fastener extensions straddling the flange gap and the unobstructed opening created by this type of fastener extension.
Figure 16:
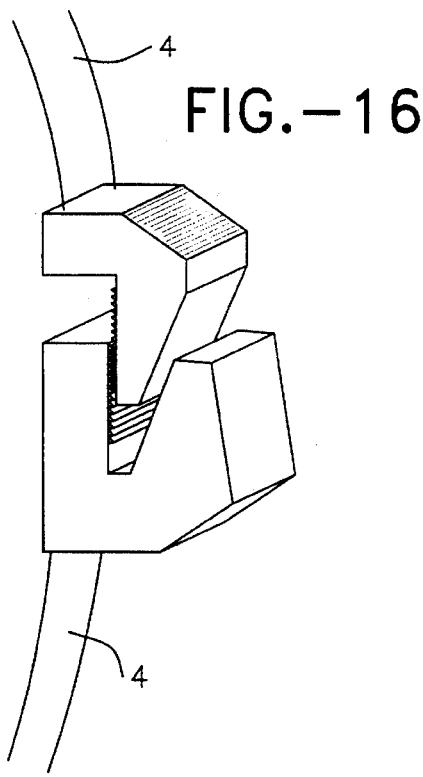
FIGS. 16 through 23 are commercially available clasps that could be substituted for the fasteners depicted in FIGS. 1 through 11.
Figure 19:
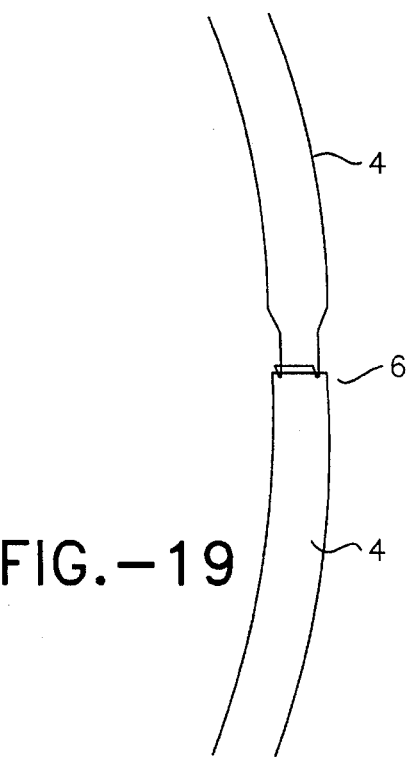
Figure 18:
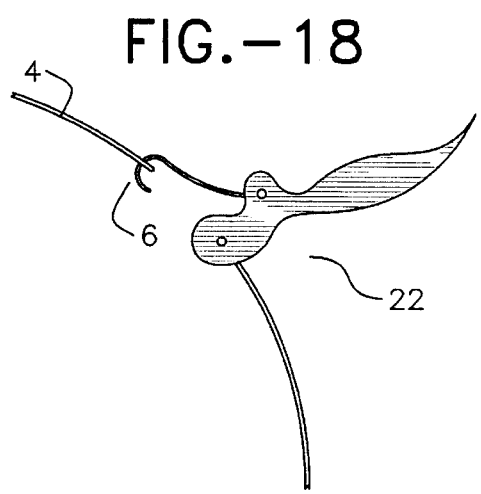
Figure 17:
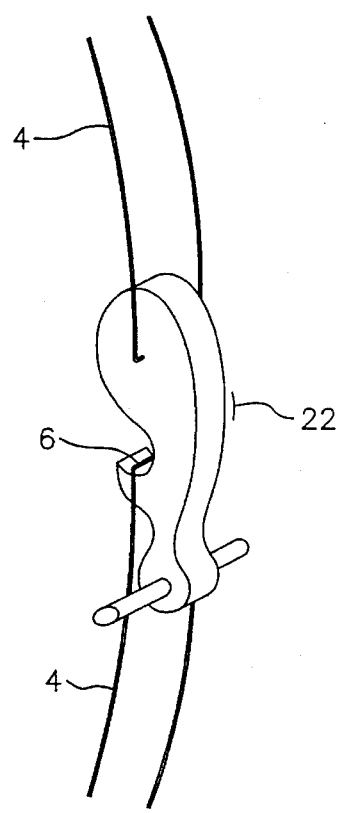
Figure 23:
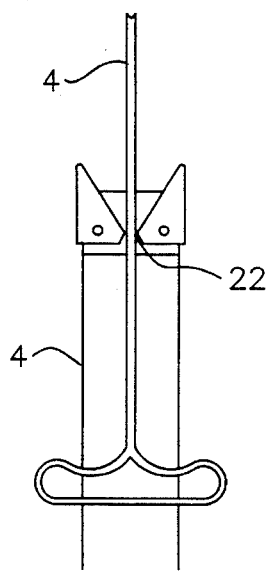
Figure 20:
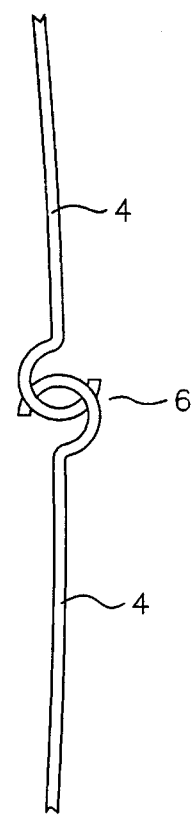
Figure 21:
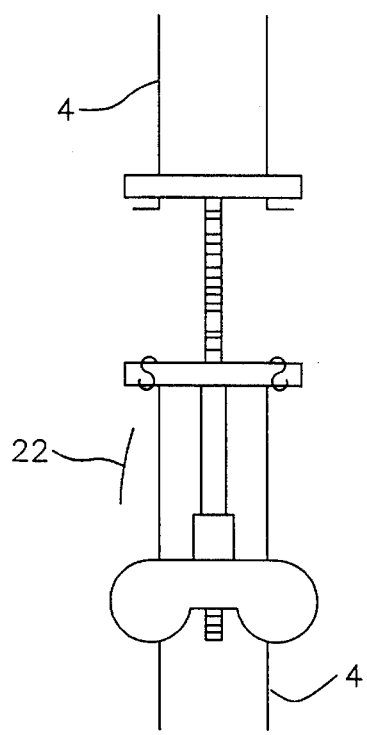
Figure 22:
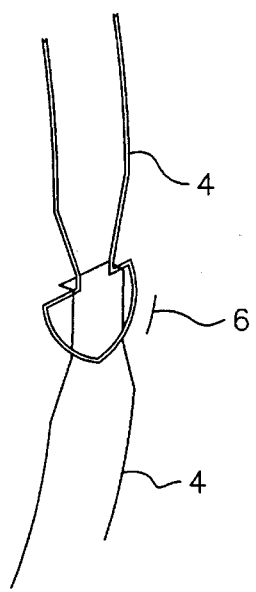

Referring now to FIGS. 1 through 11 as well as the accompanying item numbers, a description of attached drawings is as follows:

FIGS. 1 through 11 depict flange gap shields which utilize a simple hook interlock fastener; other types of commercially available fasteners that could be used in place of simple hooks are detailed in FIGS. 16 through 23. FIGS. 1 through 15 depict two different types of flange gap deflector shields each having different means for tensioning the shield to the flange gap area of the coupling. A third type of tensioner being a self-tensioning lever clamp as shown in FIGS. 14, 15 and 18. In FIG. 3 one type of new shield is depicted having an elongated body of elastic rubber 3 which allows the body to be stretched over the flange gap area and interlock the opposing fastener 6 securing the device to the flange gap area 13 of the coupling as shown in FIG. 2. It uses thin fastener extensions 4 that are flexible such as nylon or metal, such as stainless steel, to create an open area over a portion of the flange gap radius when the device is installed, as shown in FIGS. 2, 8, and 10. The fastener extensions 4 have one or more enlarged areas 5 equal in size to the main body 3 along its length, that position the fastener extensions above the gap as well as maintaining proper alignment for the elongated sealing body for best tension, as depicted in FIGS. 2, 8, and 10.

A double fastener extension 22, as depicted in FIGS. 14 and 15, could also be used. This would allow the fastener extensions to lie on the circumference of the flanges 50 providing an unobstructed opening over the gap 13 between the flanges for product discharge 20. The other type of flange gap deflector shield as shown in FIG. 4 has an elongated sealing body 7 made from a pliable material such as rubber, plastic or teflon. This body is not intended to be elastic, but instead uses spring tensioners 8 with attached fasteners 9, as shown in FIG. 1, or fastener extensions with self-tensioning lever clamp 22, as shown in FIGS. 14 and 15, for securing device to the flange gap 13 area of the pipe coupling.

The diameter of the spring 8 should be larger than the gap of the flange it is being applied to. This keeps the spring above the flange gap 13 for proper tension of the sealing body 7, as displayed in FIGS. 1, 7, and 9. Also, by keeping both fastener extensions 5 or springs 8 above the gap 13 of the flange, easy installation and removal of shield is possible. The spring tensioners 8 when stretched into position on the flange 50 create an open area over the flange gap 13 radius for product discharge, as shown in FIGS. 1, 7, and 9.

Figure 5:
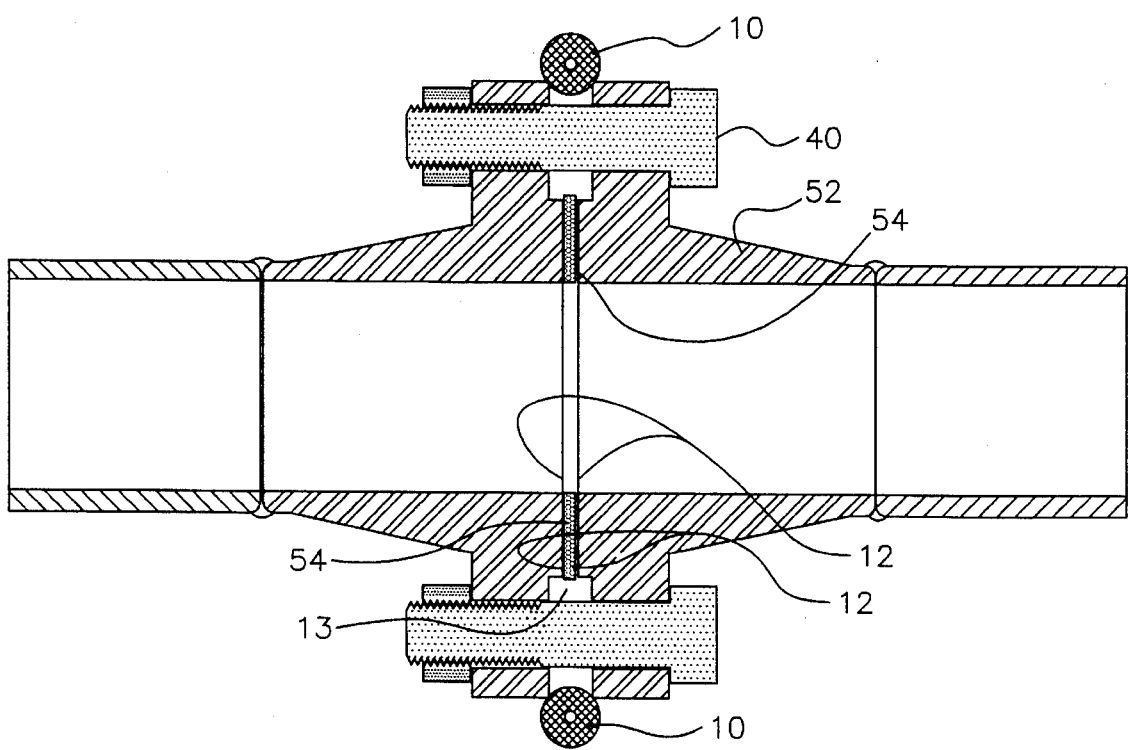
FIG. 5 is a longitudinal sectional view on the plane of 2—2 of FIG. 2. This shows the round type of shielding body seated in the gap of the flange coupling.

The cross sectional shape of the elongated body 3 or 7 should be such that it tends to move naturally into the gap area 13 of the flange to form a seal when tension is applied; shapes such as a round or tapered configuration are suitable. FIG. 5 shows a cross section view of a round sealing body 10 seated in the gap 13 of the flange, while FIG. 6 shows a tapered sealing body 11 seated in the flange gap 13 of the opposing flanges. The round configuration is a more practical design since it does not require alignment, while some applications might justify the use of a tapered shaped sealing body.

The extreme range of flange sizes in use in industry requires that different securing styles be utilized. On smaller flanges the elastic type sealing body pictured in FIGS. 3 and 12 could easily be stretched into position by a worker. When using larger devices its more practical to use spring tensioner shields such as shown in FIG. 4 or fastener extensions with self-tensioning lever clamps, as shown in FIGS. 14 and 15, rather than stretching the body of the shield as in FIG. 2.

The resulting invention thus is a shielding device that provides an area of protection to mechanics during initial unbolting of flanged pipe connections. Its design is intended to block and redirect any unexpected discharge of product away from the mechanic to the opposite side of the flange they are unbolting. This device includes an elongated body to be wrapped around a pipe flange at the gap area between the flanges. The gap between the flanges is used to position and secure the body. The elongated body is made either from a soft elastic type material such as rubber or plastic composition, or a pliable type material like rubber plastic or teflon. Since the object of this Invention is to provide protection from chemical spray for short periods of time (seconds) the need for exotic materials that resist long term chemical attack are not required in the construction of this device. The use of basic materials, such as synthetic rubber, plastic, teflon and stainless steel, which resist chemical attack short term are sufficient. This device is intended to be reused as long as contact with hazardous chemicals has taken place the shield should be discarded. Fasteners on each end of the device interlock to secure the body of the device into to the flange gap. The length of the body will less than the circumference of the flange it is being attached to, and thus it must be stretched into position to engage the opposing fasteners, creating tension for proper seating. This tension can be provided by utilizing the elasticity of the elongated body itself, by the use of spring tensioners or self-tensioning lever clamps. The cross section of the elongated body should be substantially larger than the gap of the flange it is being applied to. The cross section shape of the elongated body should also be such that it tends to move naturally into the gap when tension is applied, preferably as a round or tapered configuration. The device, when fastened, provides an area of protection greater than half the circumference of the flange, by having the elongated body securely seat in the gap of the flange over this circumference. The remaining area of the flange gap remains free to discharge possible product leaks; such discharge is not blocked by the use of springs or fastener extensions that secure the body around the blocked segment of the gap.

The resulting invention is a safety shield, filling at least half of the area between the opposing flanges of the pipe coupling, for intercepting and redirecting unexpected product releases from pipe flange couplings, during initial unbolting of flange couplings. It provides an area of protection to workers by redirecting leakage away from them during the initial unbolting of pipe flanges. The remaining unrestricted area of gap, not blocked by the body is located opposite from the work area; discharge product leaks away from worker through the area, providing a visual indication of leakage. The elongated body of the shield device is securely seated in the gap area created by the opposing flanges of a pipe coupling, where it blocks surprise leakage that may occur during the unbolting procedure, directing flow away from workers.

I claim:

1. An apparatus for protecting a worker against sudden discharge of a product from a flange coupling having a gap during opening, comprising:

an elongate flexible body having a cross-section adapted to fitting within the gap of a flanged pipe coupling;

the length of said body extending at least one half but less than all of the circumference of said flange gap;

means for securing said body within the flange gap of said pipe coupling.

2. The apparatus of claim 1 said means for fastening comprising:

said body comprising a flexible, non-elastic material;

fasteners attached to each end of said body by spring means; and said fasteners interlocking to temporarily secure said body into said flange gap.

3. The apparatus of claim 1 said means for fastening comprising:

said elongated body comprising a flexible elastic or nonelastic pliable material;

two fastener extensions extending from each end of the said body;

said extensions separated such that one extension will lie on the outer circumference of each opposing flange; and fastener interlocks or self-tensioning clamp joining the opposing extensions together securing said body to said flange.

4. The apparatus of claim 1 said elongate body being circular in cross-section, the diameter of said body being greater than the gap in said flange.

5. The apparatus of claim 1, said elongate body being tapered in cross-sections, the width of said taper being greater than the gap in said flange.

6. An apparatus for protecting a worker against sudden discharge of a product from a flange coupling during opening, comprising:

an elongate flexible body having a cross-section adapted to fitting within the gap of a flanged pipe coupling;

said body extending at least around half the circumference of said pipe coupling;

means for fastening said body within the flange of said pipe coupling;

said means for fastening comprising;

said elongate body comprising an elastic material;

fasteners attached to each end of said body by means of fastener extension;

whereby said body blocks said flange gap from discharge; and said fastener extensions permit passage of discharge from said flange gap.

7. An apparatus for protecting a worker against sudden discharge of a product from a flange coupling during opening, comprising:

an elongate flexible body having a cross-section adapted to fitting within the gap of a flanged pipe coupling;

said body extending at least around half the circumference of said pipe coupling;

means for fastening said body within the flange gap of said pipe coupling;

said means for fastening comprising;

said body comprising a flexible elastic material;

large extended hooks attached to each end of said body;

said hooks attached to separate flange bolt bodies within the gap of said flange;

whereby the separate attachment of said hooks creates a large open area for product discharge opposite the shielding body over the gap of said flange.

* * * * *